(12) United States Patent
Yoshida et al.

(10) Patent No.: US 12,503,191 B2
(45) Date of Patent: Dec. 23, 2025

(54) VEHICLE

(71) Applicant: Yamaha Hatsudoki Kabushiki Kaisha, Iwata (JP)

(72) Inventors: Masahiro Yoshida, Shizuoka (JP); Kensuke Kamada, Shizuoka (JP); Tatsuya Tanaka, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 309 days.

(21) Appl. No.: 18/458,455

(22) Filed: Aug. 30, 2023

(65) Prior Publication Data

US 2024/0076005 A1 Mar. 7, 2024

(30) Foreign Application Priority Data

Sep. 1, 2022 (JP) .................................. 2022-139556

(51) Int. Cl.
*B62K 5/007* (2013.01)
*F02M 35/16* (2006.01)

(52) U.S. Cl.
CPC ........... *B62K 5/007* (2013.01); *F02M 35/162* (2013.01)

(58) Field of Classification Search
CPC .......... B62K 5/007; B62K 5/01; B62K 11/04; F02M 35/162; B62J 35/00; B62J 40/00; B62J 43/20; B62J 25/04; B62J 43/30; B62J 50/30
See application file for complete search history.

(56) References Cited

U.S. PATENT DOCUMENTS

| | | | |
|---|---|---|---|
| 4,372,416 A * | 2/1983 | Igarashi ................. | B62K 5/027 180/215 |
| 6,732,830 B2 * | 5/2004 | Gagnon ................. | B60K 17/22 180/908 |
| 7,819,428 B2 | 10/2010 | Tsuruta et al. | |
| 9,809,110 B2 | 11/2017 | Nakamura et al. | |
| 9,873,316 B2 | 1/2018 | Lovold et al. | |
| 10,744,830 B2 * | 8/2020 | Hayashi ................. | B60K 17/34 |
| 11,072,234 B2 | 7/2021 | Takata et al. | |

(Continued)

FOREIGN PATENT DOCUMENTS

| GB | | 617867 A * | 2/1949 | ............... B62K 5/01 |
|---|---|---|---|---|
| JP | | S61278423 A * | 12/1986 | |

(Continued)

OTHER PUBLICATIONS

US 9,744,838 B2, 08/2017, Lovold et al. (withdrawn)

(Continued)

*Primary Examiner* — Michael T. Walsh
(74) *Attorney, Agent, or Firm* — Rabin & Berdo, P.C.

(57) ABSTRACT

A vehicle, including: a body frame; a saddle-style seat provided on the body frame; a pair of front wheels provided at a front portion of the body frame; a pair of rear wheels provided at a rear portion of the body frame; an engine provided in the body frame and including a crank shaft extending in a width direction of the vehicle; and a footrest provided at the body frame and including a first step and a second step provided behind the first step and extending diagonally rearward. The crank shaft is located between an upper end and a lower end of the second step in a height direction of the vehicle, and further rearward than the second step in a fore-aft direction of the vehicle.

17 Claims, 15 Drawing Sheets

(56) References Cited

U.S. PATENT DOCUMENTS 11,332,211 B2 * 5/2022 Li .................... F02M 35/10091
2012/0211290 A1 8/2012 Davis

FOREIGN PATENT DOCUMENTS

| JP | S6210226 U | * | 1/1987 |
|----|------------|---|--------|
| JP | H2049795 U |   | 4/1990 |
| JP | 2005289231 A |   | 10/2005 |
| JP | 2007071253 A |   | 3/2007 |
| JP | 4923945 B2 | * | 4/2012 |
| JP | 2017193282 A |   | 10/2017 |

OTHER PUBLICATIONS

JP-4923945-B2 English Translation (Year: 2012).*
JP-S6210226-U English Translation (Year: 1987).*
JP-S61278423-A English Translation (Year: 1986).*
GB-617867-A English Translation (Year: 1949).*
Notification of Reasons for Refusal issued in corresponding Japanese Patent Application No. 2022-139556 dated Mar. 12, 2024.

* cited by examiner

VEHICLE

CROSS REFERENCE TO RELATED APPLICATIONS

This application is based upon and claims the benefit of priority of the prior Japanese Patent Application No. 2022-139556, filed on Sep. 1, 2022, the entire contents of which are incorporated herein by reference.

BACKGROUND OF THE INVENTION

Field of the Invention

The present invention relates to vehicles, and more specifically to a straddled vehicle such as an ATV (All Terrain Vehicle).

Description of the Related Art

As an example of conventional techniques of this kind, U.S. patent Ser. No. 11/332,211 discloses a straddled vehicle. The straddled vehicle includes a frame and an engine installed in the frame. In a side view, the engine is disposed between a saddle seat and footrests.

In the straddled vehicle disclosed in U.S. patent Ser. No. 11/332,211, the rider must straddle the engine when he/she assumes a riding posture with his/her feet on the footrests. Therefore, there is room in the straddled vehicle to consider a layout in the vehicle so as to provide a comfortable ride even if the engine has an increased dimension in a width direction of the vehicle.

SUMMARY OF THE INVENTION

Therefore, a primary object of the present invention is to provide a vehicle capable of providing comfortable ride even if the engine has an increased dimension in a width direction of the vehicle.

According to an aspect of the present invention, there is provided a vehicle which includes: a body frame; a saddle-style seat provided in the body frame; a pair of front wheels provided in a front portion of the body frame; a pair of rear wheels provided in a rear portion of the body frame; an engine provided in the body frame and including a crank shaft extending in a width direction of the vehicle; and a footrest provided in the body frame and including a first step and a second step provided behind the first step and extending diagonally rearward. In the vehicle, the crank shaft is at a height, from a grounding surface of the front wheels and the rear wheels, between an upper end and a lower end of the second step, and in a side view, the crank shaft is behind the second step. In other words, the crank shaft is located between an upper end and a lower end of the second step in a height direction of the vehicle, and further rearward than the second step in a fore-aft direction of the vehicle.

In general, a dimension of an engine in a direction of its crank shaft (widthwise direction) has a maximum value near the crank shaft. Therefore, in a layout in which the engine is disposed in a body frame so that the crank shaft extends in the vehicle's width direction, a portion of the engine near the crank shaft protrudes in the vehicle's width direction. As the engine is increased in its displacement and the size of the engine increases, the widthwise dimension of the portion of the engine near the crank shaft also increases accordingly. In the present invention, the height of the crank shaft from the ground surface is between the upper end and the lower end of the second step, and in a side view, the crank shaft is behind the second step. Therefore, even if the size of the engine is increased to increase the widthwise dimension near the crank shaft, it is still possible, without being affected by the increase, to provide the footrest at a preferable position in the body frame, i.e., it is possible to provide a desirable foot area. Therefore, it is possible to make a comfortable ride even if the engine has an increased dimension in the width direction of the vehicle.

Preferably, the vehicle further includes an engine unit provided in the body frame and including the engine and a continuously variable transmission provided on an outboard side of the engine. The continuously variable transmission has an input shaft for receiving an output from the engine. In the vehicle, the input shaft is at a height, from a grounding surface of the front wheels and the rear wheels, between the upper end and the lower end of the second step, and in a side view, the input shaft is behind the second step. In other words, the input shaft is located between an upper end and a lower end of the second step in a height direction of the vehicle, and further rearward than the second step in a fore-aft direction of the vehicle. In this case, even if the size of the engine is increased to increase the widthwise dimension of the engine unit passed by the input shaft, it is still possible, without being affected by the increase, to provide the footrest at a preferable position in the body frame. Therefore, it is possible to make a comfortable ride even if the engine has an increased dimension in the width direction of the vehicle.

The invention also provides a vehicle which includes: a body frame; a saddle-style seat provided in the body frame; a pair of front wheels provided in a front portion of the body frame; a pair of rear wheels provided in a rear portion of the body frame; an engine unit provided in the body frame and including an engine and a continuously variable transmission provided on an outboard side of the engine and having an input shaft for receiving an output from the engine; and a footrest provided in the body frame and including a first step and a second step provided behind the first step and extending diagonally rearward. In the vehicle, the input shaft is at a height, from a grounding surface of the front wheels and the rear wheels, between an upper end and a lower end of the second step, and in a side view, the input shaft is behind the second step.

In general, a dimension of an engine unit, which includes an engine and a continuously variable transmission provided on an outboard side of the engine, in a direction of its crank shaft (widthwise direction) has a maximum value near a place passed by an input shaft of the continuously variable transmission. Therefore, in a layout in which the engine unit is disposed in a body frame so that the crank shaft extends in the vehicle's width direction, a portion of the engine unit near the input shaft protrudes in the vehicle's width direction. As the engine is increased in its displacement and the size of the engine increases, the engine's widthwise dimension also increases, and the widthwise dimension of the engine unit passed by the input shaft also increases accordingly. In the present invention, the height of the input shaft from the ground surface is between the upper end and the lower end of the second step, and in a side view, the input shaft is behind the second step. Therefore, even if the size of the engine is increased to increase the widthwise dimension of the engine unit passed by the input shaft, it is still possible, without being affected by the increase, to provide the footrest at a preferable position in the body frame, i.e., it is possible to provide a desirable foot area. Therefore, it is possible to make a comfortable ride even if the engine has an increased dimension in the width direction of the vehicle.

Further preferably, with an imaginary line passing through a rear end portion of the second step and extending in a width direction of the vehicle being called a first imaginary line; and an imaginary line passing through an inner end portion of the second step and extending in a fore-aft direction of the vehicle being called a second imaginary line; the first imaginary line and the second imaginary line cross each other at a point of intersection, which overlaps with the continuously variable transmission in a plan view. In this case, it becomes possible to make effective use of the space below the second step, to dispose the continuously variable transmission, or the engine unit at large, making it possible to concentrate the mass.

Further, preferably, in a side view, the second step overlaps with the continuously variable transmission. In this case, it is possible to concentrate the mass and make the vehicle compact.

Preferably, the vehicle further includes a transmission provided ahead of the engine as a separate component from the engine for speed-change of an output from the continuously variable transmission. In this case, by utilizing the transmission as a separate component from the engine, it becomes possible to increase freedom of layout of the transmission. By providing the transmission ahead of the engine, it becomes possible to make the vehicle compact.

Further preferably, the vehicle further includes an intake duct connected with the continuously variable transmission for supplying air to the continuously variable transmission, and the engine includes a cylinder block. In this arrangement, the intake duct does not overlap with the cylinder block in a plan view. In this case, it is possible to reduce hot air around the engine to be sucked from the intake duct.

Further, preferably, the vehicle further includes an intake duct connected with the continuously variable transmission for supplying air to the continuously variable transmission. The intake duct has an air inlet on the same side as the continuously variable transmission with respect to a centerline of the vehicle in a plan view. In this case, it is possible to reduce hot air around the engine to be sucked from the air inlet of the intake duct.

Preferably, the vehicle further includes an intake duct connected with the continuously variable transmission for supplying air to the continuously variable transmission. The intake duct has an air inlet at a position more forward than a front end of the saddle-style seat in a plan view. In this case, it is possible to reduce hot air around the engine to be sucked from the air inlet of the intake duct.

Further preferably, the vehicle further includes an intake duct connected with the continuously variable transmission for supplying air to the continuously variable transmission, and a battery provided ahead of the saddle-style seat. The intake duct has an air inlet at a position higher than the battery. In this case, the battery is disposed ahead of the saddle-style seat, i.e., at a position less prone to water immersion considering the expected water depth. Since the air inlet of the intake duct is provided at a higher position than the battery which is protected from water as described, it is possible to reduce chances for water to enter from the intake duct.

Further, preferably, the vehicle further includes an exhaust duct connected with the continuously variable transmission for discharging exhaust from the continuously variable transmission and having an exhaust outlet; an exhaust pipe connected with the engine for discharging exhaust from the engine; and a muffler connected with the exhaust pipe. The exhaust pipe has a first pipe portion connected with the engine, a second pipe portion connected with the muffler, and a spherical joint connecting the first pipe portion and the second pipe portion with each other. The exhaust duct has its exhaust outlet facing the spherical joint. In this case, it is possible to cool the spherical joint with exhaust from the exhaust outlet of the exhaust duct.

Preferably, at least part of the engine overlaps with the rear wheel in a side view. In this case, it is possible to concentrate the mass and make the vehicle compact.

Further preferably, the vehicle further includes a fuel tank for storage of a fuel supplied to the engine, and a canister provided between the engine and the fuel tank. In this case, it is possible to shorten the pipe which connects the canister with the fuel tank, and the pipe which connects the canister with the engine, making possible a routing which does not require detouring.

Further, preferably, the engine includes a cylinder head, and the vehicle further includes a fuel tank provided ahead of the engine. The tank has its lower end at a height lower than a lower end of the cylinder head.

Preferably, the engine includes a cylinder head, and the vehicle further includes an air cleaner provided ahead of the cylinder head so as to overlap with the engine in a front view. In this case, it is possible to make effective use of the space to make the vehicle compact.

Further preferably, the vehicle further includes an electric box provided above the fuel tank. In this case, it is possible to reduce thermal stress to the electric box from the engine, and to reduce a risk of water immersion of the electric box.

The above-described object and other objects, characteristics, aspects and advantages of the present invention will become clearer from the following detailed description of embodiments of the present invention to be made with reference to the attached drawings.

DETAILED DESCRIPTION OF THE PREFERRED EMBODIMENTS

Figure 1:
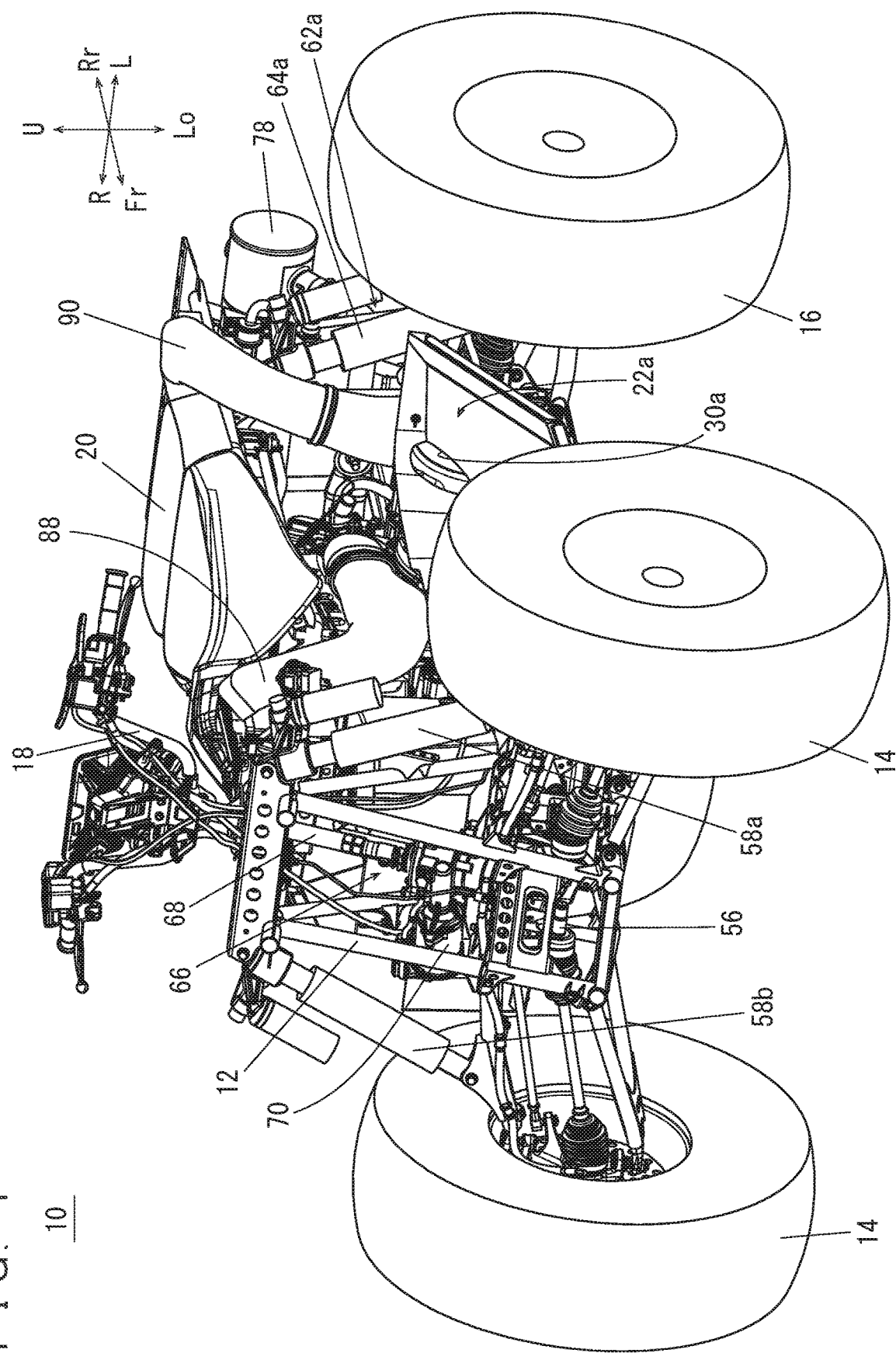
FIG. 1 is a front perspective view which shows a primary portion of a vehicle according to an embodiment of the present invention.

Hereinafter, embodiments of the present invention will be described with reference to the drawings.

In the drawings, "Fr" indicates forward, "Rr" indicates rearward, "R" indicates rightward, "L" indicates leftward, "U" indicates upward and "Lo" indicates downward.

Figure 2:
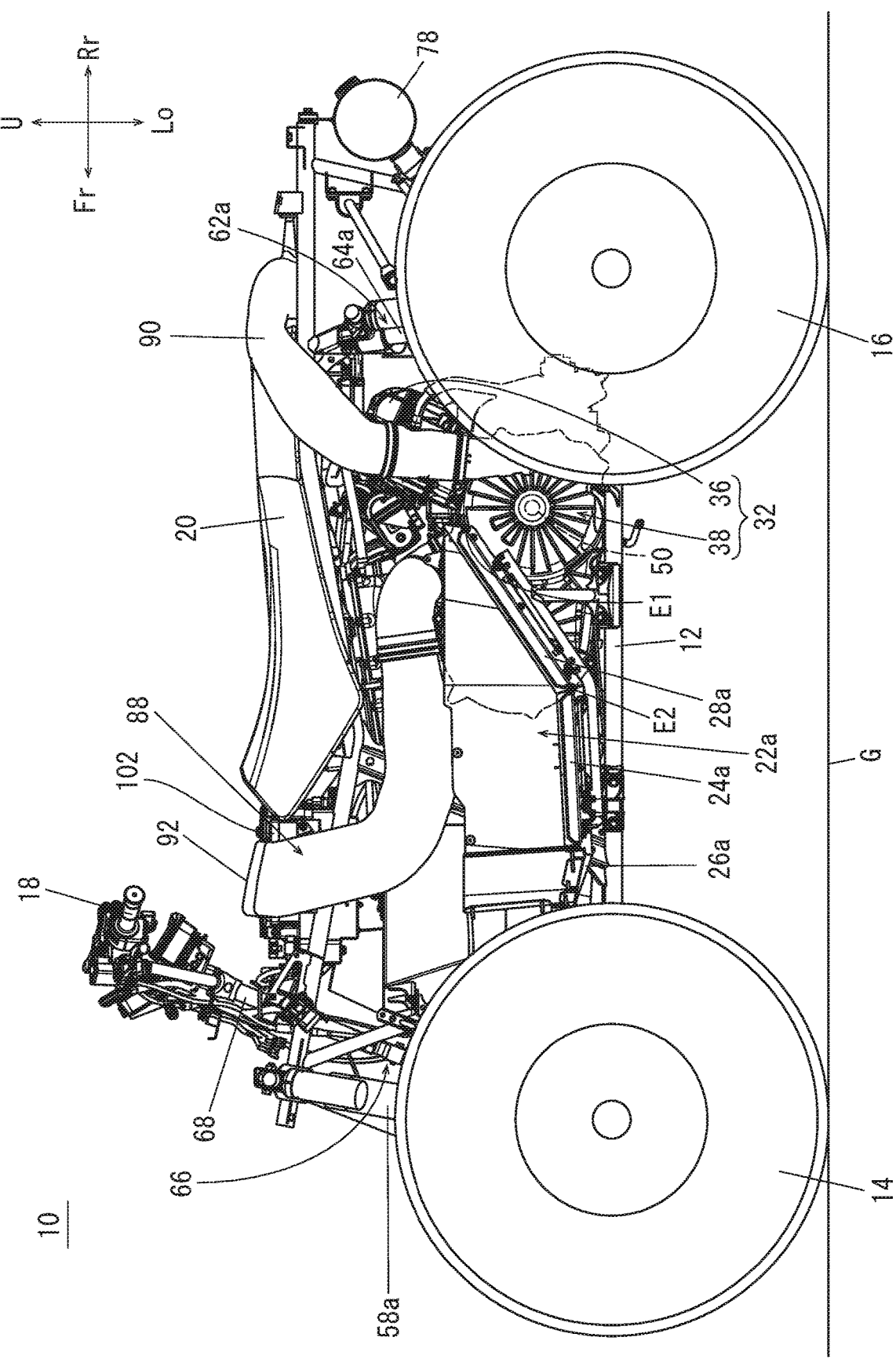
FIG. 2 is a side view from left which shows a primary portion of the vehicle in FIG. 1.
Figure 3:
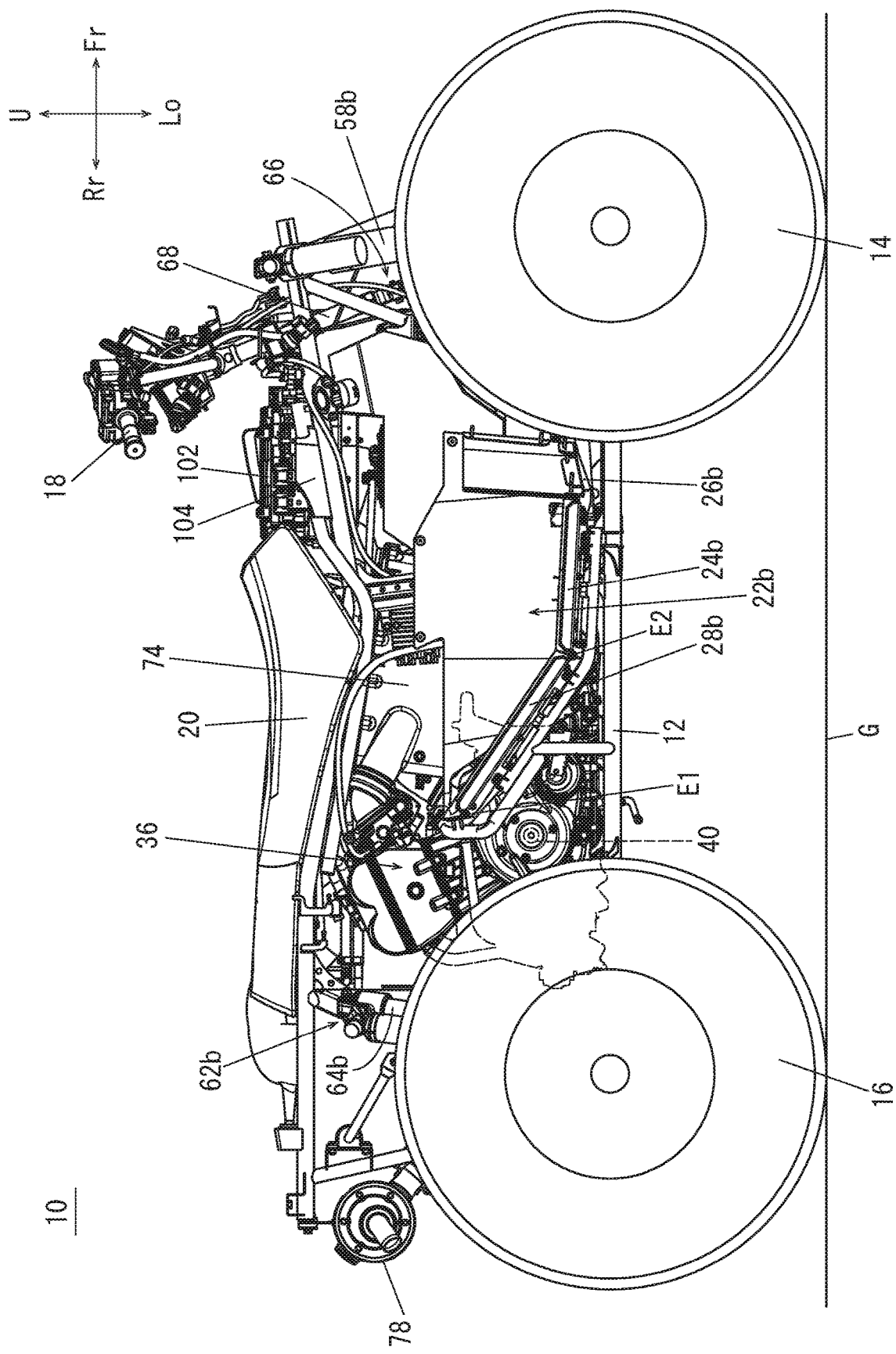
FIG. 3 is a side view from right which shows a primary portion of the vehicle in FIG. 1.

Referring to FIG. 1 through FIG. 3, a vehicle 10 according to an embodiment of the present invention is a straddled vehicle, and more specifically a four-wheeled ATV, which includes a body frame 12, a pair of front wheels 14, a pair of rear wheels 16, a bar handle 18, a saddle-style seat 20, and a pair of footrests 22a, 22b.

Referring further to FIG. 4 through FIG. 7, the pair of front wheels 14 are provided at a front portion of the body frame 12 via a pair of suspensions 58a, 58b (which will be described later). The pair of rear wheels 16 are provided at a rear portion of the body frame 12 via a pair of suspensions 62a, 62b (which will be described later). The bar handle 18 is provided at a center region in the vehicle's widthwise direction, at an upper end portion of a steering mechanism 66 (which will be described later), above the front wheels 14 in a side view. The saddle-style seat 20 is provided at a center region in the vehicle's width direction, and in a side view, at a higher position than the front wheels 14 and the rear wheels 16, between the front wheels 14 and the rear wheels 16, and is supported by the body frame 12 (i.e., provided on the body frame). The pair of footrests 22a, 22b, serving as places where the rider puts his/her respective feet, are provided at the body frame 12 between the front wheels 14 and the rear wheels 16 in a side view, and include center steps 24a, 24b, front steps 26a, 26b and rear steps 28a, 28b.

Figure 8:
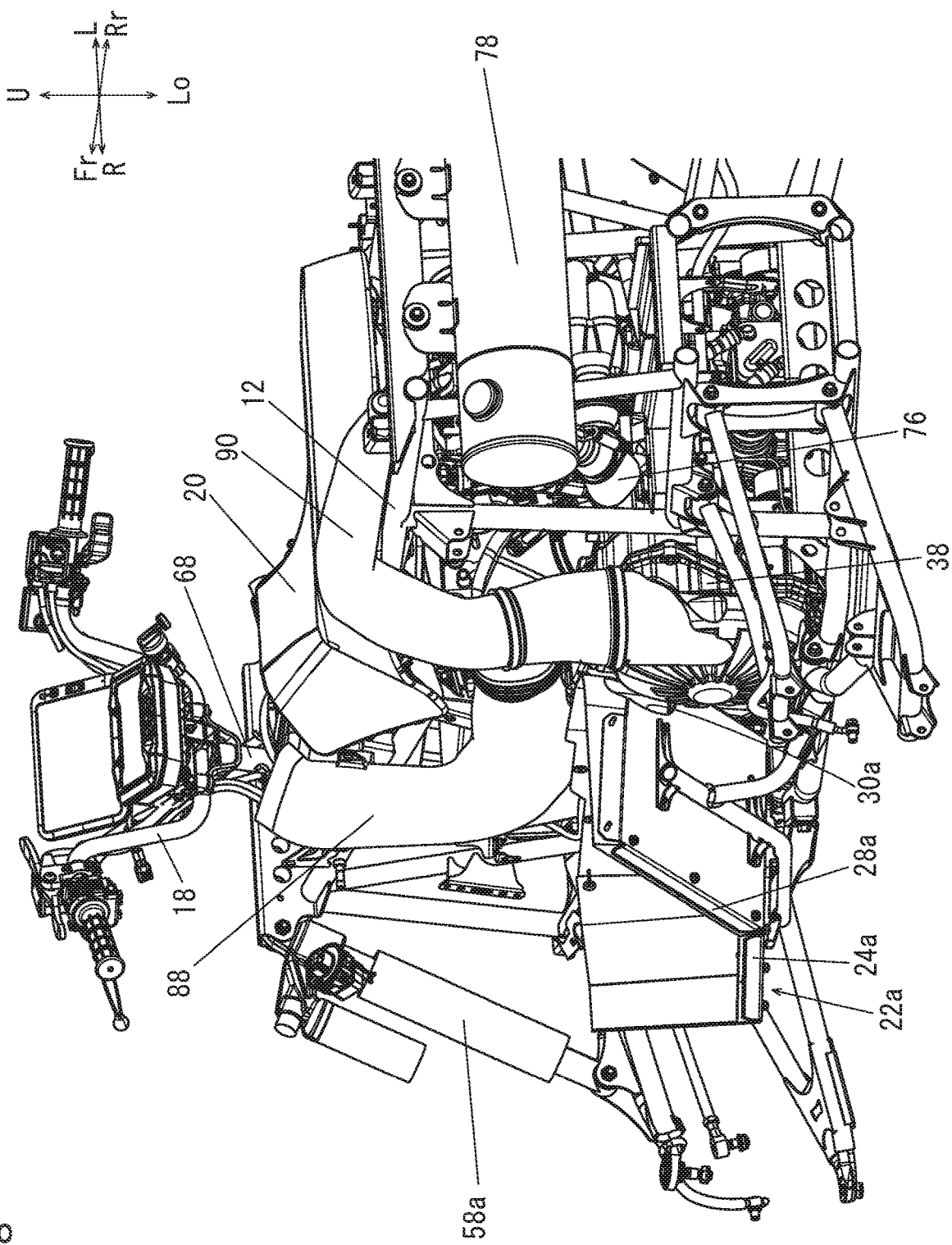
FIG. 8 is a rear perspective view which shows a foot rest and surrounds thereof.
Figure 9:
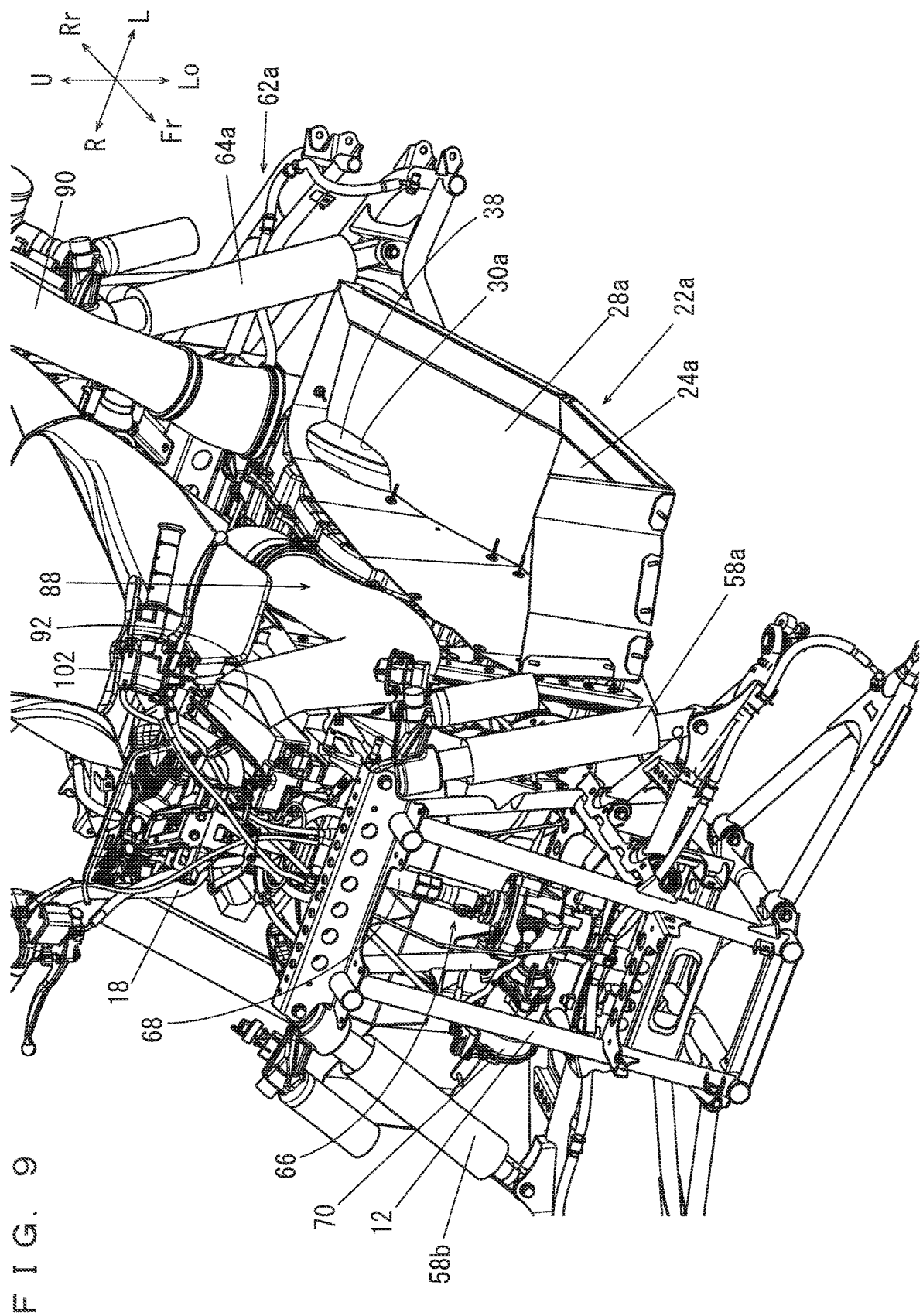
FIG. 9 is a front perspective view which shows the foot rest and surrounds thereof.

Referring further to FIG. 8 and FIG. 9, the center steps 24a, 24b are for the rider to put his/her feet when the vehicle body is horizontal, and are substantially horizontal when the vehicle body is horizontal. The front steps 26a, 26b are provided ahead of (that is, in front of) the respective center steps 24a, 24b and extend diagonally upward and forward. In other words, the front steps 26a, 26b incline diagonally upward and forward with respect to the respective center steps 24a, 24b. This gives the footrests 22a, 22b an angle of attack at their front portions. The rear steps 28a, 28b are provided behind the respective center steps 24a, 24b and extend diagonally rearward. In other words, the rear steps 28a, 28b incline diagonally upward and rearward with respect to the respective center steps 24a, 24b. The rear steps 28a, 28b are portions where the rider can put his/her feet when the vehicle body is inclined.

Figure 4:
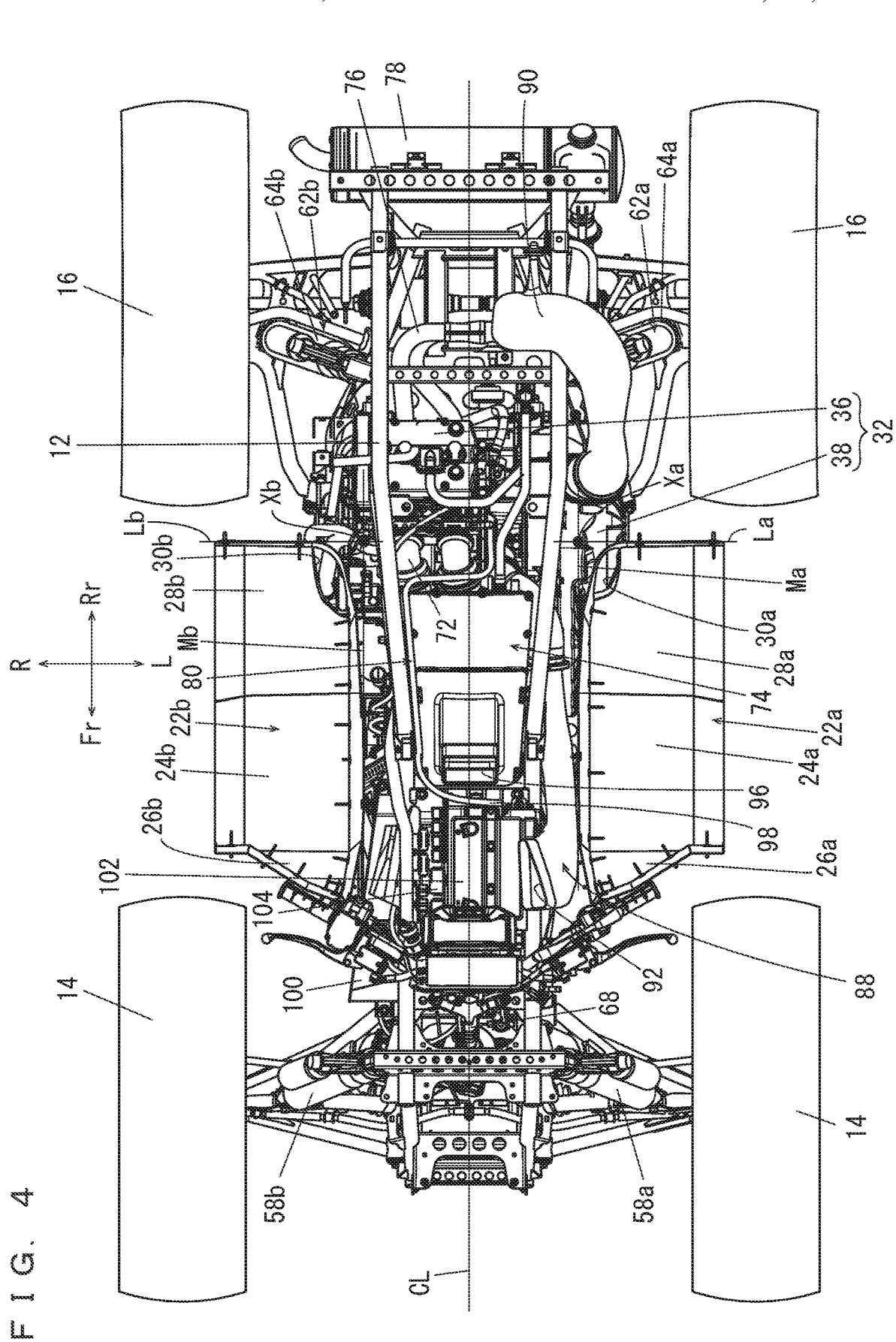
FIG. 4 is a plan view which shows a primary portion of the vehicle in FIG. 1.

Referring to FIG. 2 through FIG. 4, with an imaginary line which passes a rear end portion of the rear step 28a and extends in a vehicle's width direction being called a first, first imaginary line, La (i.e., first first imaginary line La), and an imaginary line which passes an inner end portion of the rear step 28a and extends in a fore-aft direction of the vehicle being called a first, second imaginary line, Ma (i.e., first second imaginary line Ma), the first imaginary line La and the second imaginary line Ma cross each other at a point of intersection Xa, which overlaps with a continuously variable transmission (CVT) 38 (which will be described later) in a plan view. At a corner behind and inboard of the rear step 28a, a hole 30a is formed so that the rear step 28a will not interfere with the continuously variable transmission 38. In a side view, the rear step 28a overlaps with the continuously variable transmission 38. With an imaginary line which passes a rear end portion of the rear step 28b and extends in a vehicle's width direction being called a second, first imaginary line, Lb (i.e., second first imaginary line Lb), and an imaginary line which passes an inner end portion of the rear step 28b and extends in a fore-aft direction of the vehicle being called a second, second imaginary line Mb (i.e., second second imaginary line Mb), the first imaginary line Lb and the second imaginary line Mb cross each other at a point of intersection Xb, which overlaps with an engine 36 (which will be described later) in a plan view. At a corner behind and inboard of the rear step 28b, a hole 30b is formed so that the rear step 28b will not interfere with the engine 36. In a side view, the rear step 28b overlaps with the engine 36.

Figure 5:
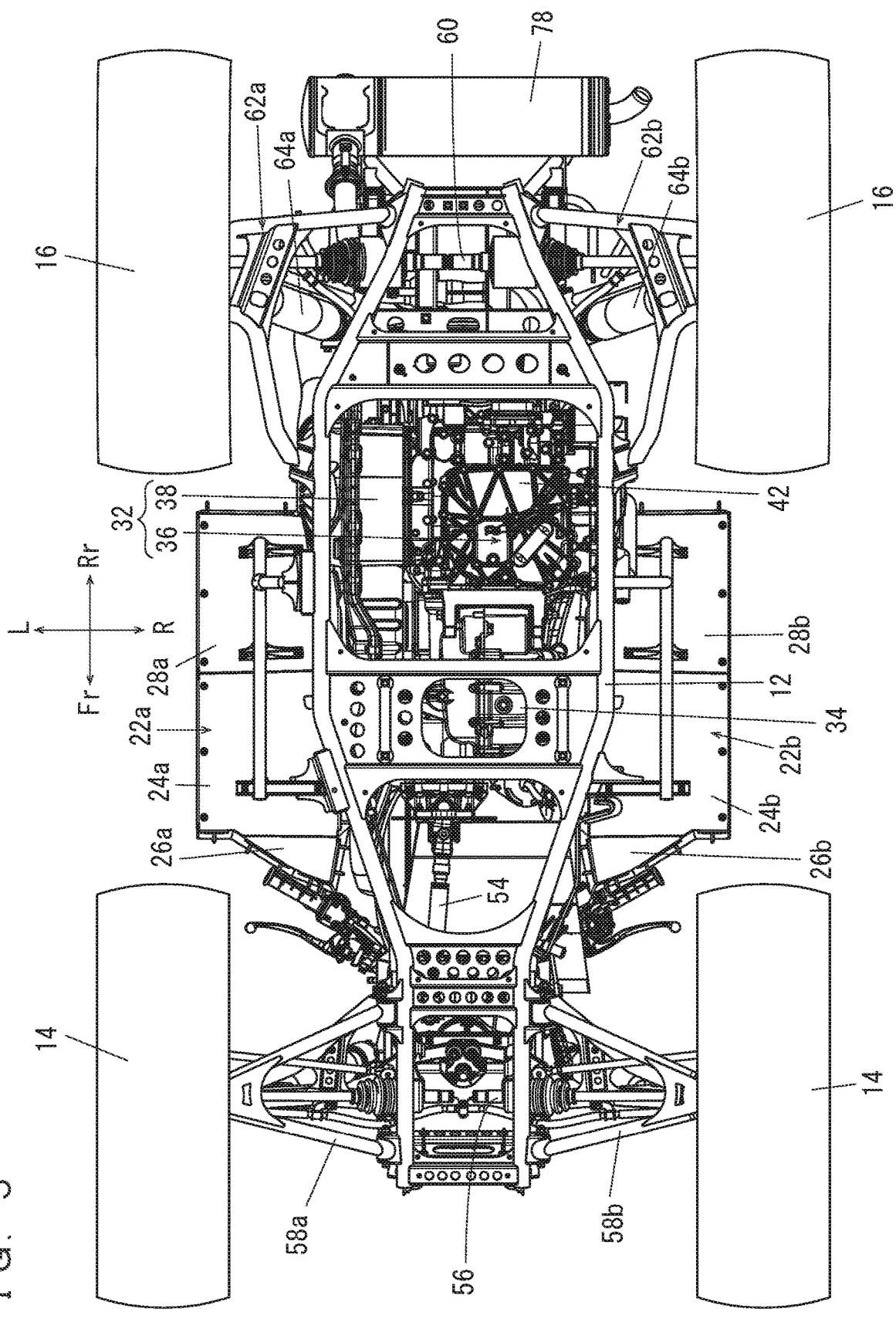
FIG. 5 is a bottom view which shows a primary portion of the vehicle in FIG. 1.
Figure 6:
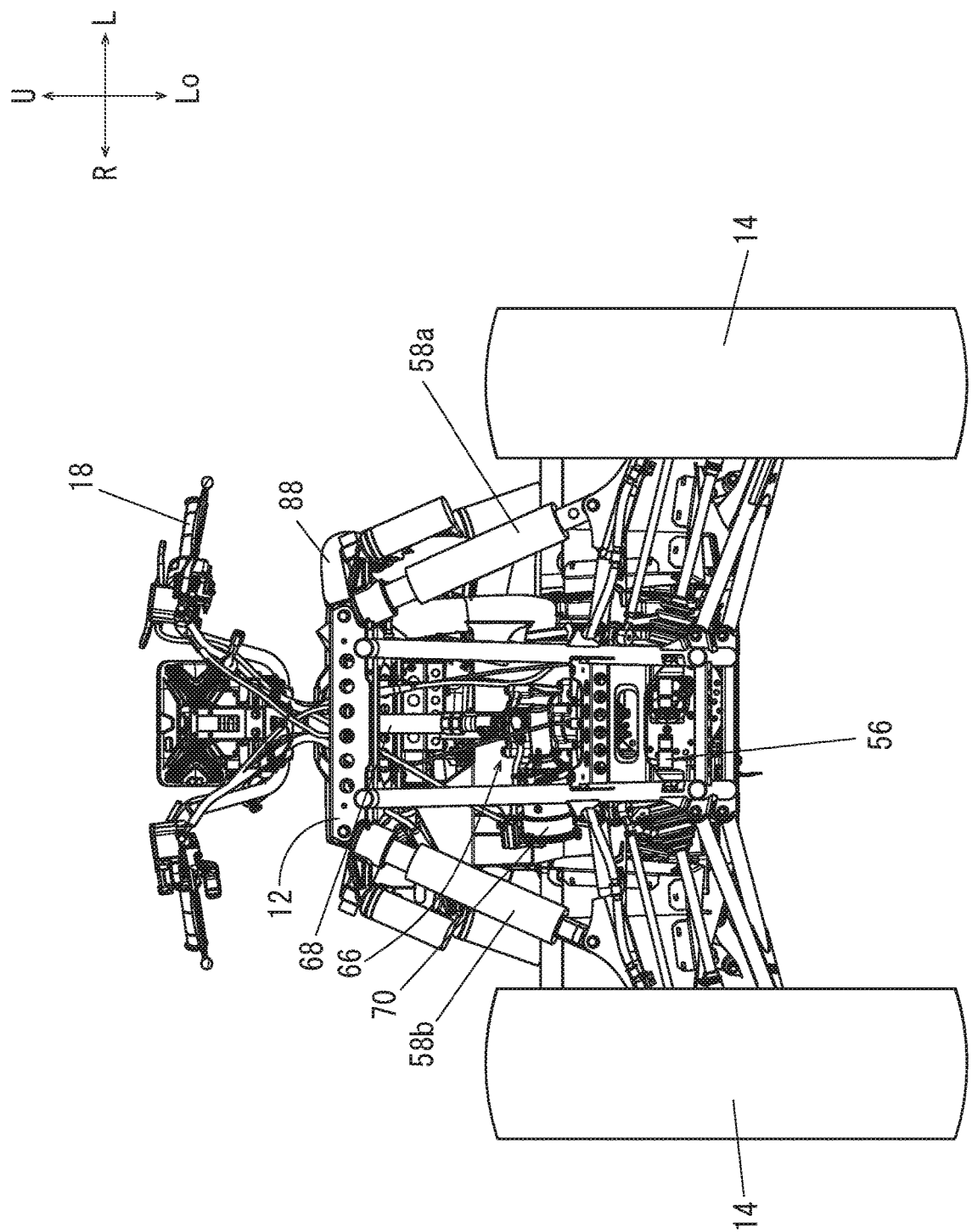
FIG. 6 is a front view which shows a primary portion of the vehicle in FIG. 1.
Figure 10:
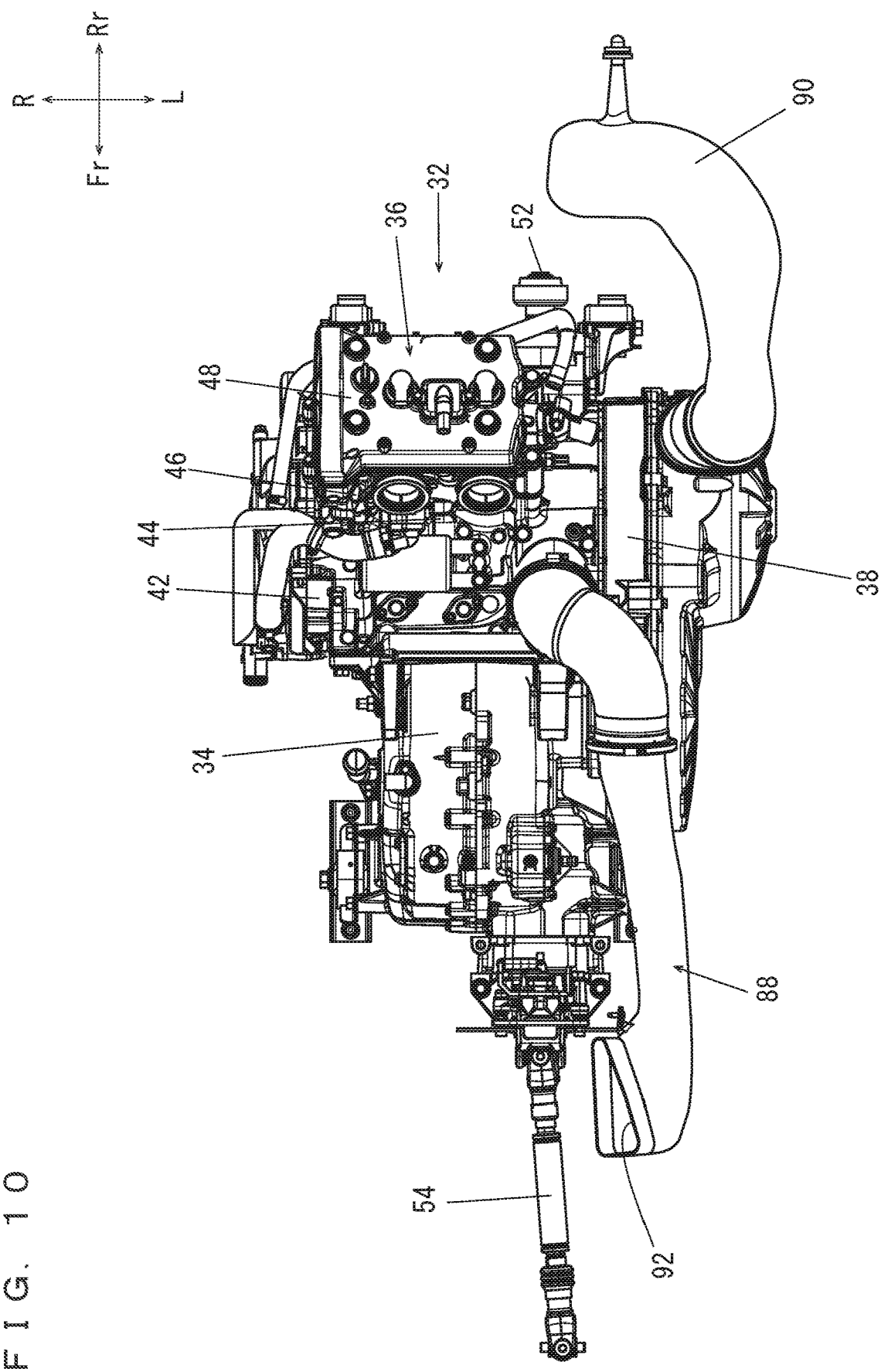
FIG. 10 is a plan view which shows an engine, a continuously variable transmission, a transmission, etc.
Figure 12:
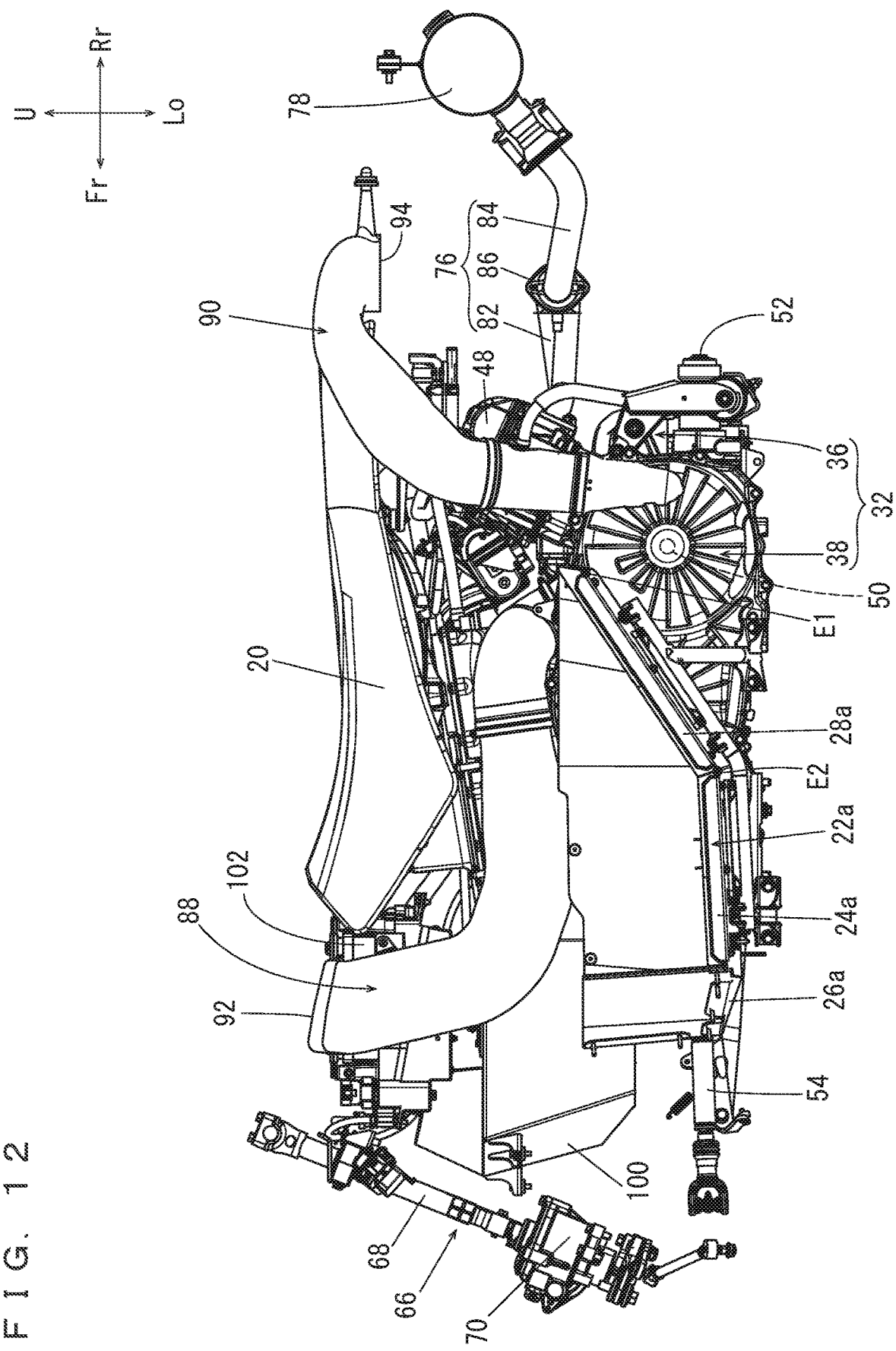
FIG. 12 is a side view which shows the intake duct and the exhaust duct of the continuously variable transmission and surrounds thereof.

Referring to FIG. 10 and FIG. 12, the vehicle 10 further includes an engine unit 32 and a transmission 34. The engine unit 32 includes the engine 36 as a prime mover, and the continuously variable transmission 38. Referring to FIG. 5, the engine unit 32 and the transmission 34 are provided in the body frame 12.

Figure 13:
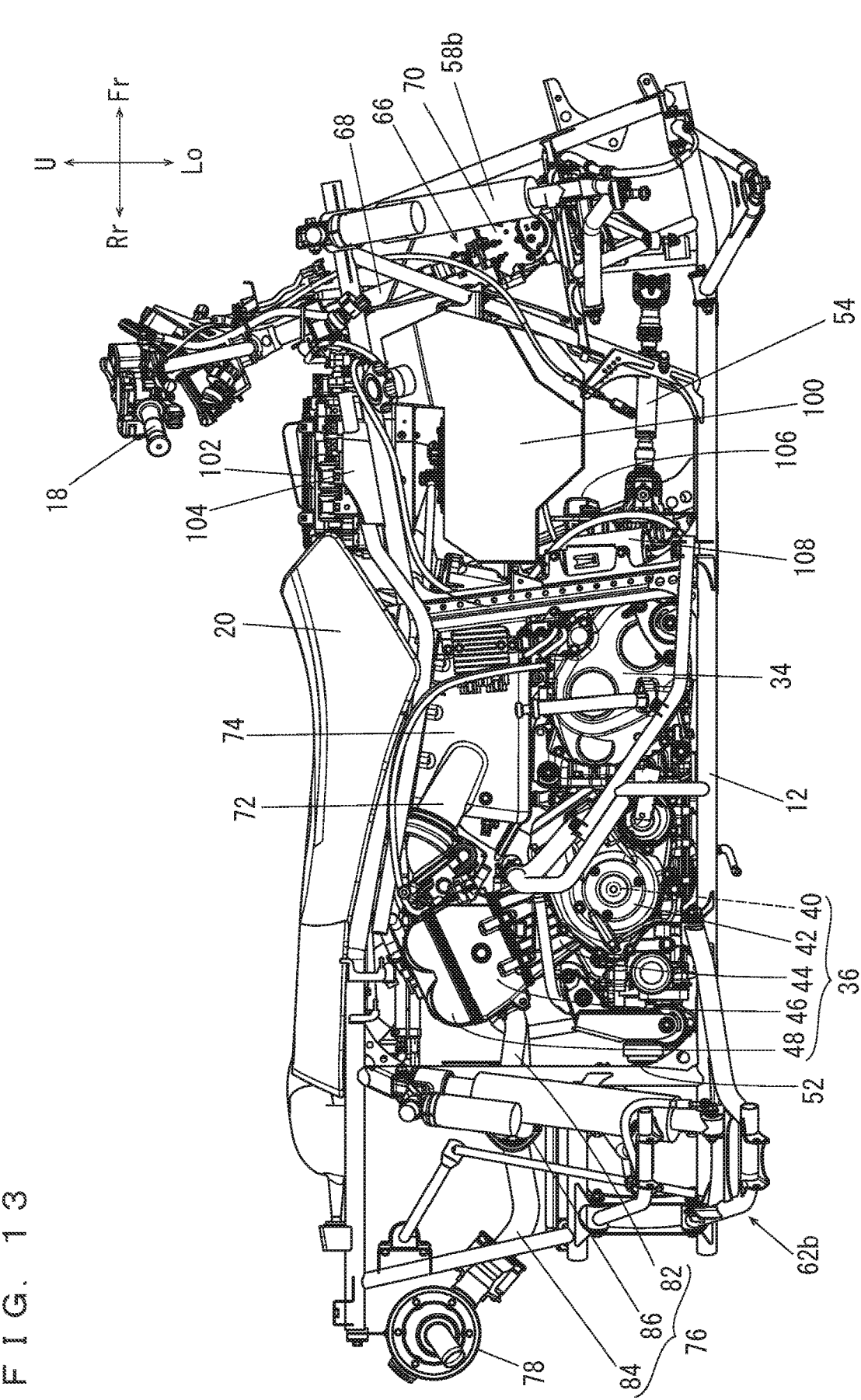
FIG. 13 is a side view from right which shows a primary portion (with a body frame) of the vehicle in FIG. 1.
Figure 14:
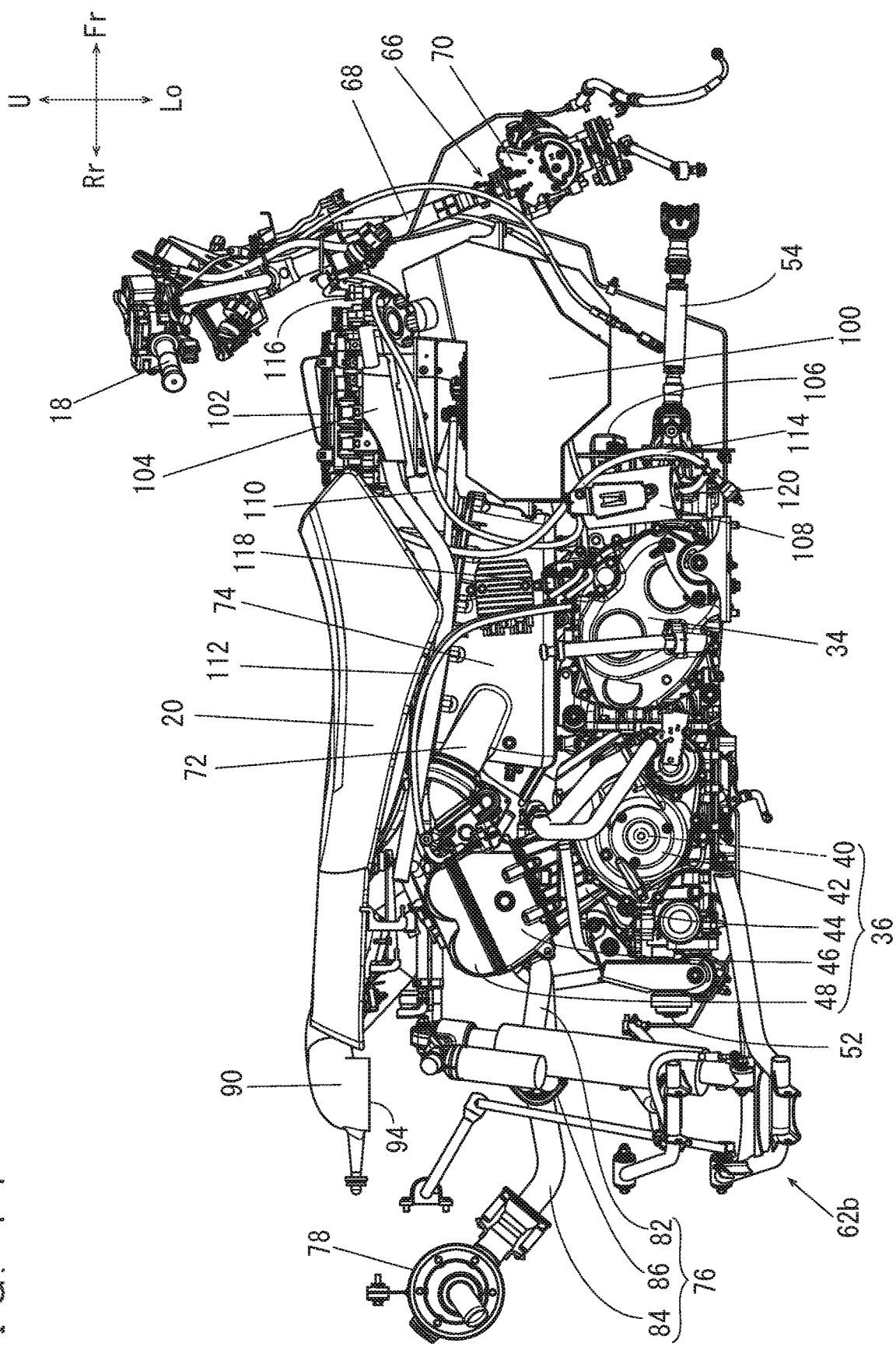
FIG. 14 is a side view from right which shows a primary portion (without the body frame) of the vehicle in FIG. 1.

Referring further to FIG. 13 and FIG. 14, the engine 36 is provided in the body frame 12, and includes a crank shaft extending in the vehicle's width direction, a crank case 42 housing the crank shaft 40, a cylinder block 44 connected with the crank case 42, a cylinder head 46 connected with the cylinder block 44, and a cylinder head cover 48 attached to the cylinder head 46. In the present embodiment, the engine 36 is provided by a parallel two-cylinder engine. The engine 36 is disposed at a place slightly rearward than a center region in a fore-aft direction of the body frame 12, with a rearward tilt. In other words, the engine 36 is laid in a rear-midship style. Referring to FIG. 2 and FIG. 3, at least part of the engine 36 overlaps with the rear wheel 16 in a side view. From a ground surface G contacted by the front wheels 14 and the rear wheels 16, a height of the crank shaft 40 is between an upper end E1 and a lower end E2 of the rear step 28a (28b), and in a side view, the crank shaft 40 is behind the rear step 28a (28b). Therefore, the crank shaft 40 is at a more rearward position than the center step 24a (24b) in a side view.

The continuously variable transmission 38 has an input shaft 50 which extends in the vehicle's width direction and receives an output from the engine 36, and is provided at an outboard side (left side, in the present embodiment) of the engine 36. A height of the input shaft 50 from the ground surface G is between an upper end E1 and a lower end E2 of the rear step 28a (28b), and in a side view, the input shaft 50 is behind the rear step 28a (28b). Therefore, the input shaft 50 is at a more rearward position than the center step 24a (24b) in a side view.

The transmission 34 is provided ahead of the engine 36, as a separate component from the engine 36 in order to speed-change an output from the continuously variable transmission 38. The engine 36 and the transmission 34 are connected with each other via the continuously variable transmission 38.

Referring to FIG. 5 through FIG. 7, FIG. 10, FIG. 12 and FIG. 14, the vehicle 10 further includes: a propeller shaft 52 which is connected with the transmission 34 and extending in a fore-aft direction; a front shaft 54 which is connected with a front end portion of the propeller shaft 52; a rotation transmission portion 56 which transmits rotation coming from the transmission 34 via the propeller shaft 52 and the front shaft 54, to the pair of front wheels 14; the pair of suspensions 58a, 58b which suspend the pair of front wheels 14; a rear shaft (not illustrated) which is connected with a rear end portion of the propeller shaft 52; a rotation transmission portion 60 which transmits rotation coming from the transmission 34 via the propeller shaft 52 and the rear shaft, to the pair of rear wheels 16; and the pair of suspensions 62a, 62b which suspend the pair of rear wheels 16.

The rotation transmission portion 56 is connected with the engine 36 via the front shaft 54, the propeller shaft 52, the transmission 34 and the continuously variable transmission 38. The rotation transmission portion 60 is connected with the engine 36 via the rear shaft, the propeller shaft 52, the transmission 34 and the continuously variable transmission 38. Therefore, rotation of the engine 36 undergoes speed change performed by the continuously valuable transmission 38 and the transmission 34, and then transmitted to the pair of front wheels 14 via the propeller shaft 52, the front shaft 54, and the rotation transmission portion 56. This rotates the pair of front wheels 14. Also, rotation of the engine 36 undergoes speed change performed by the continuously valuable transmission 38 and the transmission 34, and then transmitted to the pair of rear wheels 16 via the propeller shaft 52, the rear shaft, and the rotation transmission portion 60. This rotates the pair of rear wheels 16. The pair of suspensions 62a, 62b include shock absorbers 64a, 64b respectively. Each of the shock absorbers 64a, 64b is at a more forward position than a wheel center of the pair of rear wheels 16, at a more forward position than a muffler 78 (which will be described later). This makes it is possible to concentrate the mass.

The vehicle 10 further includes the steering mechanism 66 for steering the pair of front wheels 14.

The steering mechanism 66 includes a steering shaft 68, and an electric power steering (EPS) 70 provided on the steering shaft 68. The electric power steering 70 is provided ahead of a fuel tank 100 (which will be described later).

Referring to FIG. 4 and FIG. 14, the vehicle 10 further includes: an intake pipe 72 which is connected with the engine 36 (cylinder head 46) in order to supply air to the engine 36; an air cleaner 74 which is connected with the intake pipe 72; an exhaust pipe 76 which is connected with the engine 36 (cylinder head 46) in order to discharge exhaust from the engine 36; the muffler 78 which is connected with the exhaust pipe 76; and a breather hose 80 which is connected with the engine 36 in order to discharge blow-by gas from the engine 36.

Figure 7:
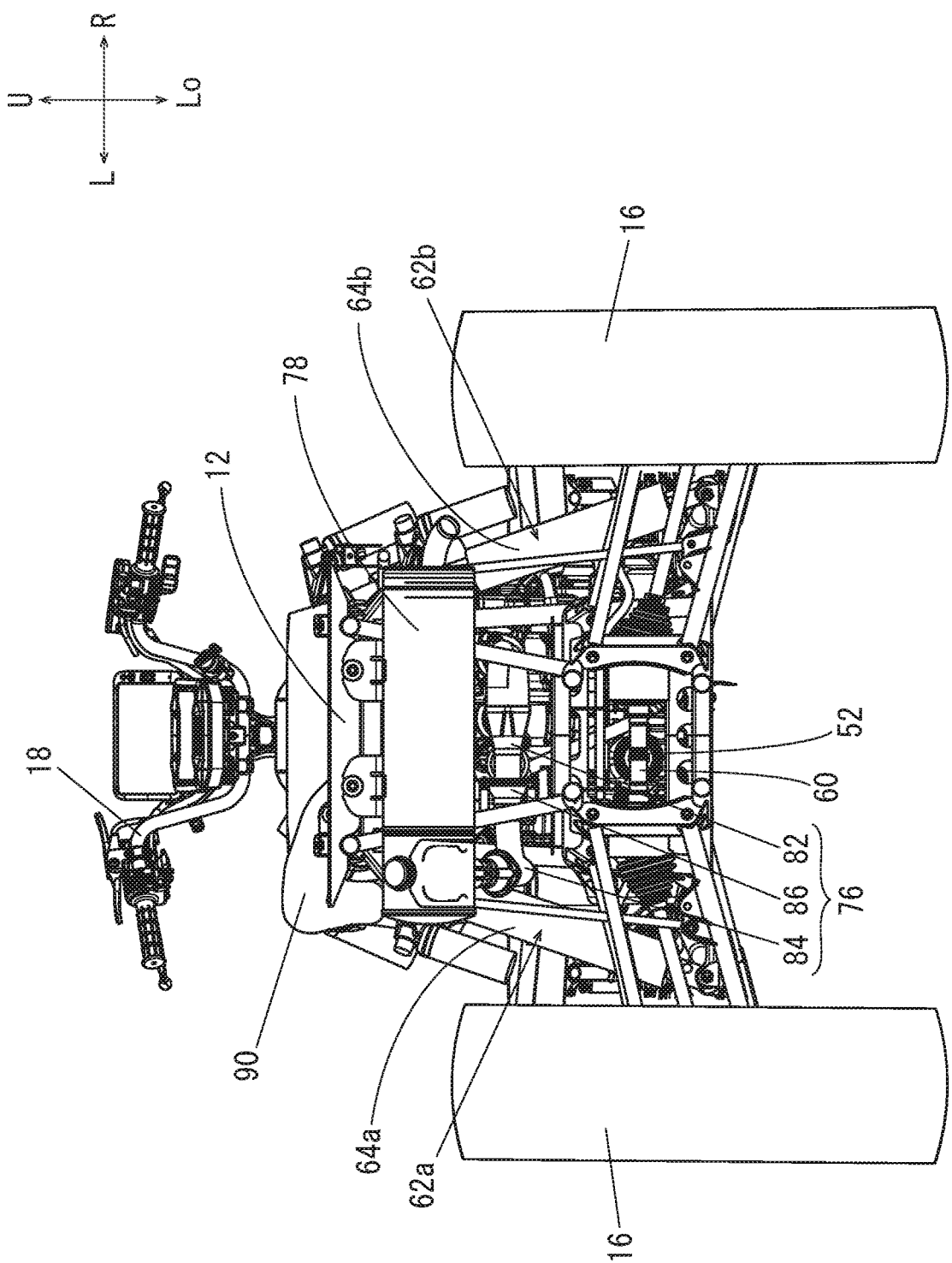
FIG. 7 is a rear view which shows a primary portion of the vehicle in FIG. 1.

The air cleaner 74 is provided ahead of the cylinder head 46 to overlap with the engine 36 in a front view, below the saddle-style seat 20. The muffler 78 is provided behind the engine 36. The intake pipe 72 is connected with a front portion of the cylinder head 46. The exhaust pipe 76 is connected with a rear portion of the cylinder head 46. Therefore, the engine 36 has a structure called front intake rear exhaust. Referring further to FIG. 7 and FIG. 12, the exhaust pipe 76 has: a first pipe portion 82 connected with the engine 36; a second pipe portion 84 connected with the muffler 78; and a spherical joint 86 which connects the first pipe portion 82 and the second pipe portion 84 with each other.

Referring to FIG. 9 through FIG. 12, the vehicle 10 further includes an intake duct 88 which is connected with the continuously variable transmission 38 for supplying air to the continuously variable transmission 38, and an exhaust duct 90 which is connected with the continuously variable transmission 38 in order to discharge exhaust from the continuously variable transmission 38.

The intake duct 88 has an air inlet 92. The exhaust duct 90 has an exhaust outlet 94. Referring further to FIG. 4, in a plan view, the air inlet 92 is on the same side as the continuously variable transmission 38 with respect to a centerline CL of the vehicle 10, at a position more forward than a front end of the saddle-style seat 20 in a plan view. The air inlet 92 of the intake duct 88 is provided at a position higher than a battery 102 (which will be described later). The intake duct 88 does not overlap with the cylinder block 44, the cylinder head 46 or the cylinder head cover 48 of the engine 36 in a plan view. The exhaust duct 90 is oriented so that the exhaust outlet 94 faces the spherical joint 86 of the exhaust pipe 76. The air inlet 92 of the intake duct 88, an air inlet 96 of the air cleaner 74, and an outlet end portion 98 of the breather hose 80 are disposed at a position covered by an unillustrated top cover. The arrangement makes it possible to reduce a risk that the intake duct 88, the air cleaner 74 and breather hose 80 will be flooded.

Figure 11:
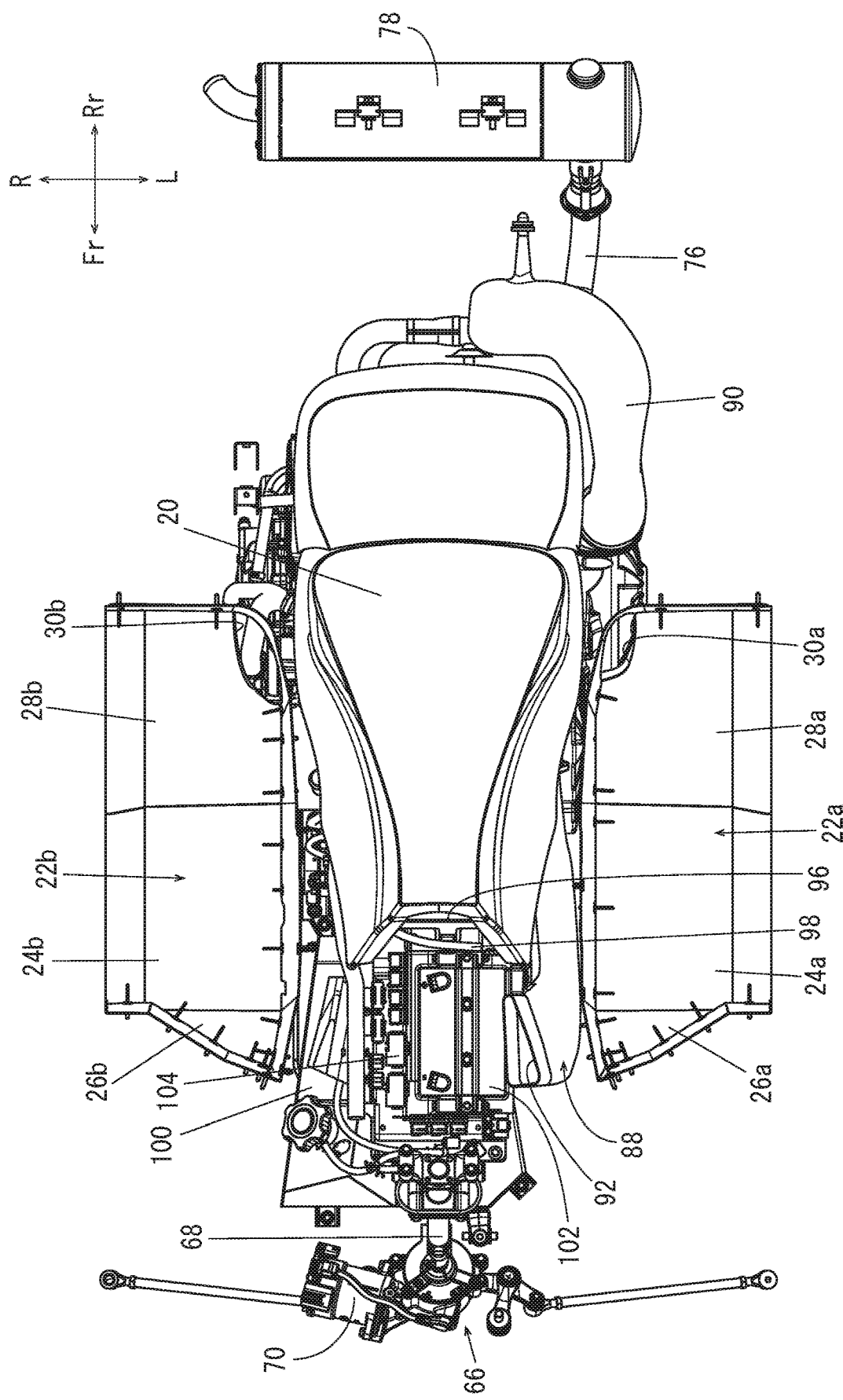
FIG. 11 is a plan view which shows an intake duct and an exhaust duct of the continuously variable transmission and surrounds thereof.

Referring to FIG. 11 and FIG. 14, the vehicle 10 further includes: the fuel tank 100 which stores fuel to be supplied to the engine 36; the battery 102 and an electric box 104 provided above the fuel tank 100; and a parking brake 106 and a canister 108 which are provided below the fuel tank 100, ahead of the transmission 34.

The fuel tank 100 is provided ahead of the engine 36 so that its lower end is lower than a lower end of the cylinder head 46. The fuel tank 100 is at a position diagonally forward and upward of the transmission 34, ahead of the air cleaner 74. The battery 102 and the electric box 104 are provided side by side ahead of the saddle-style seat 20.

The canister 108 is provided between the engine 36 and the fuel tank 100. The canister 108 is disposed at a position invisible from outside, being covered by an outer cover (not illustrated). The canister 108 and the fuel tank 100 communicate with each other via a pipe 110. The canister 108 and the engine 36 communicate with each other via a pipe 112. The canister 108 and the air cleaner 74 communicate with each other via a pipe 114. The pipe 110 is provided with a rollover valve 116. The pipe 112 is provided with an air-cut valve 118. The pipe 114 is provided with a one-way valve 120. From the fuel tank 100, the pipe 110 supplies the canister 108 with fuel vapor, which then is adsorbed by activated charcoal inside the canister 108. While the engine 36 is running, partial vacuum from the engine 36 sucks air inside the canister 108, so the air inside the air cleaner 74 flows through the pipe 114, into the canister 108. In this process, the fuel vapor adsorbed by the activated charcoal is separated from the activated charcoal, and sent through the pipe 112 to the engine 36 for combustion.

In the present embodiment, the center steps 24a, 24b represent the first step and the rear steps 28a, 28b represent the second step.

According to the straddled vehicle 10 as has been described thus far, the height of the crank shaft 40 from the ground surface G is between the upper end E1 and the lower end E2 of the rear step 28a (28b), and in a side view, the crank shaft 40 is behind the rear step 28a (28b). Therefore, even if the size of the engine 36 is increased to increase a widthwise dimension near the crank shaft 40, it is still possible, without being affected by the increase, to provide the footrests 22a, 22b at preferable positions in the body frame 12, i.e., it is possible to provide desirable feet area. Therefore, it is possible to make a comfortable ride even if the engine 36 has an increased dimension in width direction of the vehicle.

Also, the height of the input shaft 50 from the ground surface G is between the upper end E1 and the lower end E2 of the rear step 28a (28b), and in a side view, the input shaft 50 is behind the rear step 28a (28b). Therefore, even if the size of the engine 36 is increased to increase a widthwise dimension passing the input shaft 50 of the engine unit 32, it is still possible, without being affected by the increase, to provide the footrests 22a, 22b at preferable positions in the body frame 12, i.e., it is possible to provide desirable feet area. Therefore, it is possible to make a comfortable ride even if the engine 36 has an increased dimension in a width direction of the vehicle.

In a plan view, the first imaginary line La and the second imaginary line Ma cross each other at the point of intersection Xa, which overlaps with the continuously variable transmission 38. This makes it possible to make effective use of the space below the rear step 28a, to dispose the continuously variable transmission 38, or the engine unit 32 at large, making it possible to concentrate the mass.

In a plan view, the first imaginary line Lb and the second imaginary line Mb cross each other at the point of intersection Xb, which overlaps with the engine 36. This makes it possible to make effective use of the space below the rear step 28b, to dispose the engine 36, or the engine unit 32 at large, making it possible to concentrate the mass.

In a side view, the rear step 28a overlaps with the continuously variable transmission 38. This makes it possible to concentrate the mass, and to make the vehicle compact.

Utilizing the transmission 34 as a separate component from the engine 36 makes it possible to increase freedom of layout of the transmission 34. Providing the transmission 34 ahead of the engine 36 makes it possible to make the vehicle 10 compact.

The intake duct 88 does not overlap with the cylinder block 44 in a plan view. This makes it possible to reduce hot air around the engine 36 to be sucked from the intake duct 88.

The air inlet 92 of the intake duct 88 is on the same side as the continuously variable transmission 38 with respect to the centerline CL of the vehicle 10 in a plan view. This makes it possible to reduce hot air around the engine 36 to be sucked from the air inlet 92 of the intake duct 88.

The air inlet 92 of the intake duct 88 is at a position more forward than the front end of the saddle-style seat 20 in a plan view. This makes it possible to reduce hot air around the engine 36 to be sucked from the air inlet 92 of the intake duct 88.

The battery 102 is disposed ahead of the saddle-style seat 20, i.e., at a position less prone to water immersion considering the expected water depth, and the air inlet 92 of the intake duct 88 is provided at a higher position than the battery 102. This makes it possible to reduce chances for water to enter from the intake duct 88.

The exhaust duct 90 is provided so that the exhaust outlet 94 faces the spherical joint 86. This makes it possible to cool the spherical joint 86 with exhaust from the exhaust outlet 94 of the exhaust duct 90.

In a side view, at least part of the engine 36 overlaps with the rear wheels 16. This makes it possible to concentrate the mass, and to make the vehicle 10 compact.

The canister 108 is provided between the engine 36 and the fuel tank 100. This makes it possible to shorten the pipe 110 which connects the canister 108 with the fuel tank 100, and the pipe 112 which connects the canister 108 with the engine 36, making possible a routing which does not require detouring.

The canister 108 is disposed at a position covered by the outer cover (not illustrated) and invisible from outside. Thus, a cover dedicated only to the canister 108 is not needed.

The fuel tank 100 is provided at a position diagonally forward and upward of the transmission 34. This makes it possible to make the vehicle 10 compact.

The air cleaner 74 is provided ahead of the cylinder head 46 to overlap with the engine 36 in a front view. This makes it possible to utilize space effectively and to make the vehicle 10 compact.

The electric box 104 is provided above the fuel tank 100. This makes it possible to reduce thermal stress to the electric box 104 from the engine 36, and to reduce a risk of water immersion of the electric box 104.

The parking brake 106 is provided below the fuel tank 100. This makes it possible to concentrate the mass, and make the vehicle 10 compact.

The electric power steering 70 is provided ahead of the fuel tank 100. This makes it possible to concentrate the mass, and make the vehicle 10 compact.

Figure 15A:
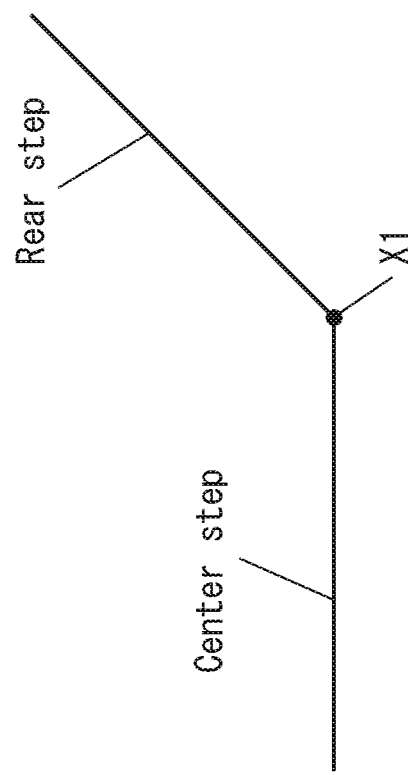
FIG. 15A and FIG. 15B are illustrative drawings for describing a rear end of a center step and a front end (lower end) of a rear step.

It should be noted here that the rear end of the center step and the front end (lower end) of the rear step are determined as follows:

Referring to FIG. 15A, in a case where the center step and the rear step are connected with each other to form an angled bent in a side view, a point of intersection X1 between the center step and the rear step is taken as the rear end of the center step and the front end (lower end) of the rear step.

Figure 15B:
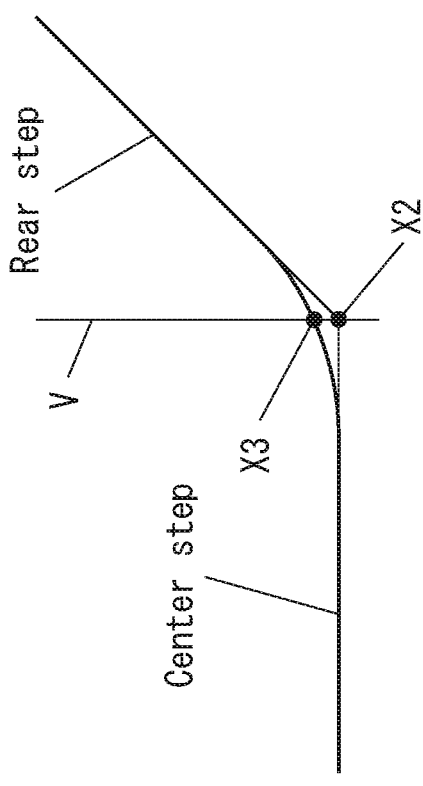

Referring to FIG. 15B, in a case where the center step and the rear step are connected with each other by a curved line in a side view, a point of intersection X2 between an extension of the center step and an extension of the rear step is obtained, using a case where the body is horizontal as a reference, and then, a point of intersection X3 made by a vertical line V which passes the intersection X2 and the curved line is taken as the rear end of the center step and the front end (lower end) of the rear step.

Also, the present invention is not limited to the case where the center step and the rear step are connected with (continuous to) each other. They may be apart from each other. A step may be provided between the center step and the rear step.

In the embodiment described above, description was made for a case where the footrests 22a, 22b have front steps 26a, 26b. However, the footrests need not necessarily have front steps.

The present invention being thus far described in terms of preferred embodiments, it is obvious that these may be varied in many ways within the scope and the spirit of the present invention. The scope of the present invention is limited only by the accompanied claims.

The invention claimed is:

1. A vehicle comprising:
a body frame;
a saddle-style seat provided on the body frame;
a pair of front wheels provided at a front portion of the body frame;
a pair of rear wheels provided at a rear portion of the body frame;
an engine provided in the body frame and including a crank shaft extending in a width direction of the vehicle; and
a footrest provided at the body frame and including a first step and a second step provided behind the first step and extending diagonally rearward, wherein the crank shaft is located between an upper end and a lower end of the second step in a height direction of the vehicle, and further rearward than the second step in a fore-aft direction of the vehicle.

2. The vehicle according to claim 1, further comprising an engine unit provided in the body frame and including:
the engine, and
a continuously variable transmission provided on an outboard side of the engine and having an input shaft for receiving an output from the engine, wherein
the input shaft is located between the upper end and the lower end of the second step in the height direction of the vehicle, and further rearward than the second step in the fore-aft direction of the vehicle.

3. The vehicle according to claim 1, wherein the engine at least partially overlaps with the rear wheel in a side view of the vehicle.

4. The vehicle according to claim 1, further comprising:
a fuel tank for storage of a fuel to be supplied to the engine, and
a canister provided between the engine and the fuel tank.

5. The vehicle according to claim 4, further comprising an electric box provided above the fuel tank.

6. The vehicle according to claim 1, wherein
the engine includes a cylinder head, and
the vehicle further comprises a fuel tank provided in front of the engine, a lower end of the fuel tank being lower than a lower end of the cylinder head in the height direction of the vehicle.

7. The vehicle according to claim 6, further comprising an electric box provided above the fuel tank.

8. The vehicle according to claim 1, wherein
the engine includes a cylinder head, and
the vehicle further comprises an air cleaner provided in front of the cylinder head so as to overlap with the engine in a front view of the vehicle.

9. A vehicle comprising:
a body frame;
a saddle-style seat provided on the body frame;
a pair of front wheels provided at a front portion of the body frame;
a pair of rear wheels provided at a rear portion of the body frame;
an engine unit provided in the body frame and including:
an engine, and
a continuously variable transmission provided on an outboard side of the engine and having an input shaft for receiving an output from the engine; and
a footrest provided at the body frame and including a first step and a second step provided behind the first step and extending diagonally rearward, wherein
the input shaft is located between an upper end and a lower end of the second step in a height direction of the vehicle, and further rearward than the second step in a fore-aft direction of the vehicle.

10. The vehicle according to claim 9, wherein
a first imaginary line and a second imaginary line cross each other at a point of intersection, which overlaps with the continuously variable transmission in a plan view of the vehicle, wherein
the first imaginary line is an imaginary line passing through a rear end portion of the second step and extending in a width direction of the vehicle, and
the second imaginary line is an imaginary line passing through an inner end portion of the second step and extending in the fore-aft direction of the vehicle.

11. The vehicle according to claim 9, wherein the second step overlaps with the continuously variable transmission in a side view.

12. The vehicle according to claim 9, further comprising a transmission provided in front of the engine as a separate component from the engine for speed-change of an output from the continuously variable transmission.

13. The vehicle according to claim 9, further comprising an intake duct connected with the continuously variable transmission for supplying air to the continuously variable transmission, wherein
the engine including a cylinder block, and
the intake duct does not overlap with the cylinder block in a plan view of the vehicle.

14. The vehicle according to claim 9, further comprising an intake duct connected with the continuously variable transmission for supplying air to the continuously variable transmission, wherein
the intake duct has an air inlet on a same side as the continuously variable transmission with respect to a centerline of the vehicle in a plan view thereof.

15. The vehicle according to claim 9, further comprising an intake duct connected with the continuously variable transmission for supplying air to the continuously variable transmission, wherein
the intake duct has an air inlet at a position more forward than a front end of the saddle-style seat in a plan view of the vehicle.

16. The vehicle according to claim 9, further comprising:
an intake duct connected with the continuously variable transmission for supplying air to the continuously variable transmission, and
a battery provided in front of the saddle-style seat, wherein
the intake duct has an air inlet at a position higher than the battery.

17. The vehicle according to claim 9, further comprising:
an exhaust duct connected with the continuously variable transmission for discharging exhaust from the continuously variable transmission,
an exhaust pipe connected with the engine for discharging exhaust from the engine, and
a muffler connected with the exhaust pipe, wherein
the exhaust pipe has:
a first pipe portion connected with the engine,
a second pipe portion connected with the muffler, and
a spherical joint connecting the first pipe portion and the second pipe portion with each other, and
the exhaust duct has an exhaust outlet facing the spherical joint.

* * * * *